UNITED STATES PATENT OFFICE.

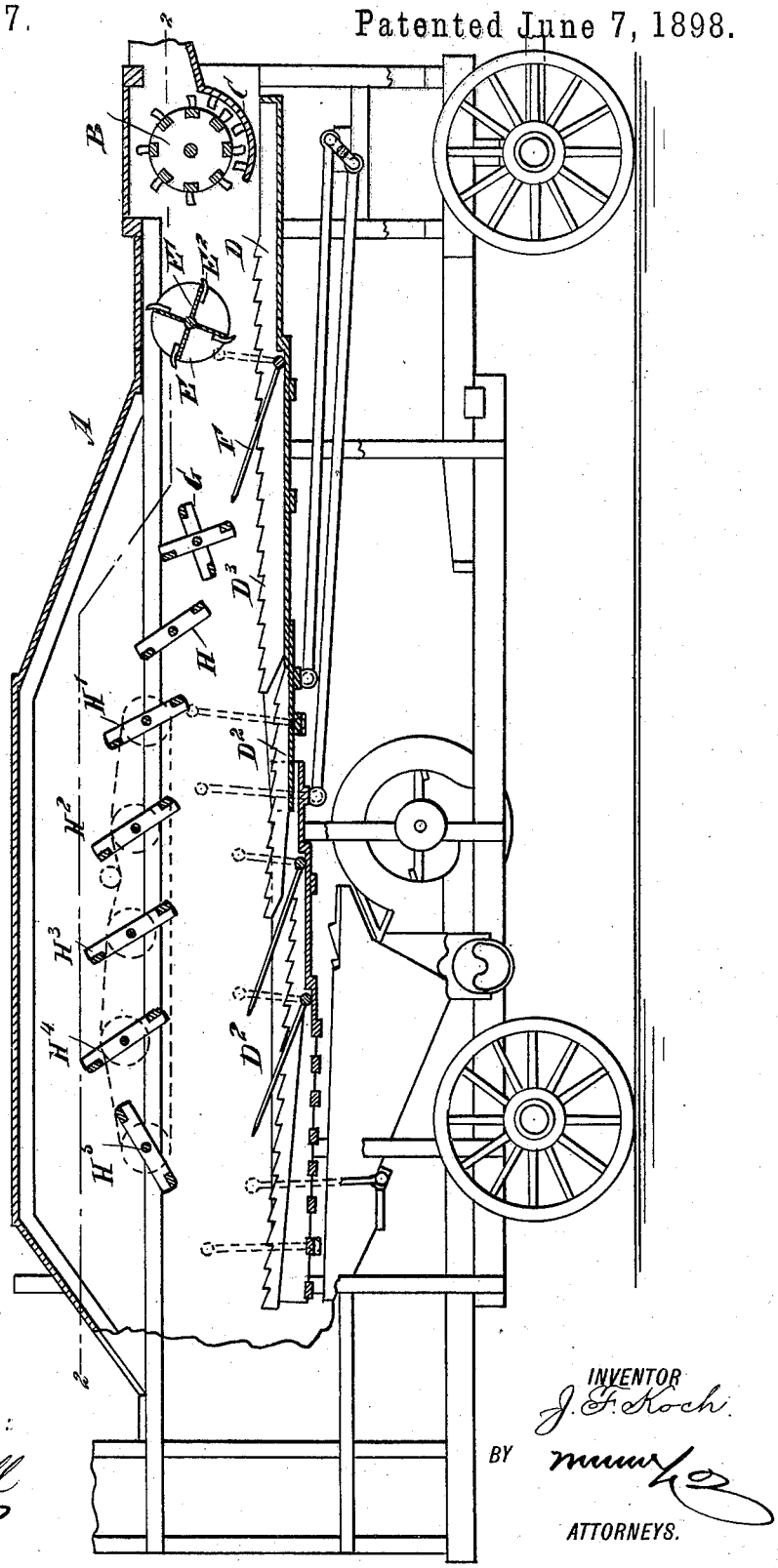

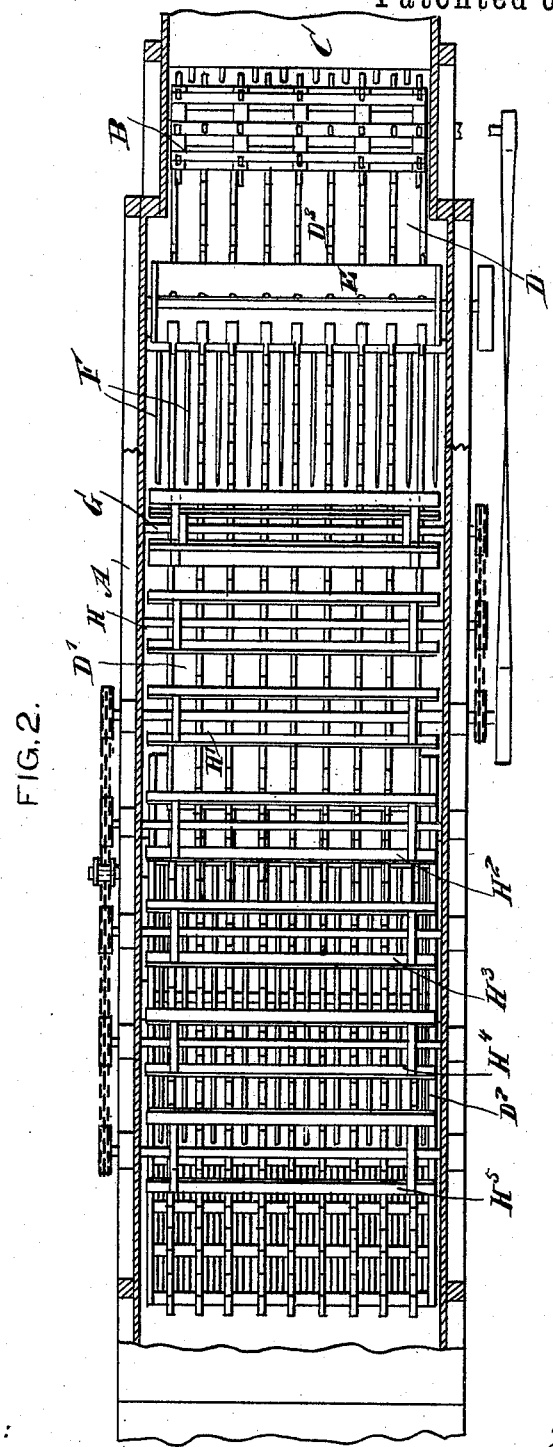

JACOB F. KOCH, OF NEW ATHENS, ILLINOIS, ASSIGNOR TO HIMSELF, AND THE HARRISON MACHINE WORKS, OF BELLEVILLE, ILLINOIS.

GRAIN-SEPARATOR.

SPECIFICATION forming part of Letters Patent No. 605,437, dated June 7, 1898.

Application filed September 12, 1896. Serial No. 605,580. (No model.)

*To all whom it may concern:*

Be it known that I, JACOB F. KOCH, of New Athens, in the county of St. Clair and State of Illinois, have invented certain new and useful Improvements in Grain-Separators, of which the following is a full, clear, and exact description.

The invention relates to grain-separators such as shown and described in the Letters Patent of the United States, No. 180,050, granted to Theophilus Harrison and W. C. Buchanan on March 6, 1877.

The object of the present invention is to provide certain new and useful improvements in grain-separators, whereby a thorough and complete separation of the grain, chaff, and straw is obtained without any waste whatever of grain.

The invention consists principally of a straw-conveying mechanism elevated over the separating-pans to carry the straw bodily clear of the said pans and independently of the chaff and grain.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in both the figures.

Figure 1 is a sectional side elevation of the improvement, and Fig. 2 is a sectional plan view of the same on the line 2 2 of Fig. 1.

The improved grain-separator in the form of a threshing-machine is provided with a housing A, a threshing or beating cylinder B, operating in conjunction with a toothed concave C in the usual manner for threshing the grain, the material falling into the first separating-pan D, discharging at its rear end into a second separating-pan D′, discharging into a separating-pan D² in the usual manner. The several separating-pans are provided with notched longitudinal strips D³ for moving the chaff and short straw rearwardly.

Above the first separating-pan D and in the rear of the threshing-cylinder B is arranged a revoluble straw-beater E, provided with wings E′, from which project teeth E², as plainly indicated in the drawings. In the rear of this revoluble straw-beater and below the same is arranged a lifting-rack F, having a swinging motion and having its prongs extending between the notched strips D³, as plainly indicated in Figs. 1 and 2. The free end of the rack F discharges the straw upon the first revoluble straw-lifter G, which tosses the straw over upon a second revoluble straw-lifter H, located in the rear of the lifter G and somewhat above the same. (See Fig. 1.)

A series of straw-lifters H′ H² H³ H⁴ H⁵ are arranged one behind the other next to the lifter H, and all are revoluble and preferably located at different horizontal planes with an increase in diameter, as indicated in Fig. 1. The rearmost lifter H⁵ has its axis preferably somewhat below the axis of the preceding lifter H⁴, so that the straw receives a downward as well as rearward impetus. The several lifters G H H′ H² H³ H⁴ H⁵ are formed with any desirable number of wings, the first lifter G being preferably formed with four wings and the other ones with but two wings, as indicated in the drawings.

When the machine is in operation, the grain and chaff after passing the cylinder B and concave C are thrown upon the strips D′ in the pans D and carried by their motion to the lifting-rake F, operating with its prongs between the said strips. The lifting-rake F lifts and moves the straw above the strips after it is moved and spread by the revolving straw-beater E, which, in conjunction with the said lifting-rake, causes the straw to pass upward and rearward upon the first revolving straw-lifter G, which throws the straw over and rearwardly upon the next lifter H, which in turn discharges the straw over upon the following lifter H², and this operation is repeated by the following lifters, so that the straw is carried in the upper part of the housing A a suitable distance above the separating-pans D′ D². Thus the several straw-lifters H H′ H² H³, &c., form a straw-conveying mechanism elevated a suitable distance above the separating-pans and serving to carry the straw bodily clear of the said pans and independently of the chaff, short straw, and grain passing along the said separating-pans.

It is evident that when the straw is bodily lifted into the upper part of the housing and carried rearward, as described, then the wheat and chaff are completely separated from the straw and dropped to the bottom of the pans, and hence do not become mingled with the mass of straw.

The revoluble straw-beater E is preferably run slower than the cylinder B, so as to check any flying grain from the cylinder and also to check the momentum of the straw. The teeth $E^2$ on the said straw-beater serve to pull and assist the straw up and upon the rake F, but the teeth are bent rearwardly to let go of the straw in its rearward passage. The beater thus has three functions. First, it checks the momentum of the straw, it stops the flying grain thrown by the cylinder during the threshing operation, and it pulls and tears apart and distributes the straw to permit a better action of the lifting-rake.

The straw-lifters G H H' $H^2$ $H^3$ $H^4$ $H^5$ are preferably made with increasing diameters for the purpose of carrying the body of the straw above the pans and to pull apart, agitate, and draw out the straw into a thin sheet to permit any grain carried by the straw to drop down into the separating-pan below. The lifters, owing to having increased diameters, accelerate the passage of the straw from one to the other. It is expressly understood that these lifters do not beat down the straw, but lift the same and shake out any grain contained in the straw and at the same time move the straw rearward and out of the machine. I do not limit myself to the number of lifters employed or to the form given to the same. It is also understood that the first lifter G gives an uplifting and pulling action at the same angle to the top of the second or next lifter H and at the same time permits the grain contained in the straw to fall down into the pan D'. It is understood that during the operation of these lifters in moving the straw rearwardly in the upper part of the housing the grain, chaff, and short straws are carried toward the windmill and shoe by the separating-pans. The first lifters rotate somewhat slower than the following ones, so that the straw is entirely relieved of all the momentum received during its passage through the cylinder.

The straw-lifters are rotated from a suitable part of the thresher, preferably by a belt or a sprocket-chain from a pulley or a sprocket-wheel that drives the separating-pans. The lifters may have their speed gradually increased singly or in groups, so as to give constant agitation and pulling apart of the straw during its rearward movement.

It will be seen that ample room is given for the action of the separating apparatus in the pans and an unobstructed blast from the fan through the throats. The action of this blast is not impeded by the body of straw, as heretofore, and readily passes through the throats, openings, and riddles of the shoe and enables a better cleaning to be done with less blast from the fan and without blowing off or wasting the grain.

The term "separating-pan," referred to in the specification, is used as a generic expression to define any approved separating-pan or analogous mechanism.

Having thus described my invention, I claim as new and desire to secure by Letters Patent—

1. In a grain-separator, the combination of a threshing-cylinder and concave, a vibrating separating-pan located below the cylinder and concave and receiving the straw and grain from the cylinder and concave, a straw-beater located above the separating-pan in rear of and adjacent to the cylinder, the straw-beater serving to throw the grain and straw downward upon the separating-pan and to spread the straw, a vibrating lifting-rack located in rear of the straw-beater and serving to raise the straw and other coarse material from the separating-pan, and an elevated straw-carrier over the separating-pan and receiving the straw from the said lifting-rack.

2. In a grain-separator, the combination of a threshing-cylinder and concave, a vibrating separating-pan located below the cylinder and concave, the separating-pan receiving the straw and grain from the cylinder and concave, a vibrating lifting-rack located in rear of the point on the separating-pan, which point first receives the straw and grain, and serving to raise the straw and other coarse material from the separating-pan, and an elevated straw-carrier located over the separating-pan and receiving the straw from said lifting-rack.

3. In a grain-separator, the combination with the threshing-cylinder and its concave, of a separating-pan having one end extending under the concave, a revoluble beater in rear and adjacent to the cylinder for throwing the straw and grain down upon the separating-pan, a series of revoluble straw-lifters in rear of the beater and above the separating-pan, the lifters being of gradually-increasing diameters, and the front and rear lifters having their axes below the intermediate ones, and a vibrating rack arranged between the beater and the first lifter and serving to raise the straw and other coarse material from the pan and guide it onto the said lifters, substantially as herein shown and described.

JACOB F. KOCH.

Witnesses:
HENRY SPRING,
GEORGE A. HARVEY.